United States Patent [19]

Mori

[11] Patent Number: 5,662,548

[45] Date of Patent: Sep. 2, 1997

[54] START CONTROLLER FOR AUTOMATIC TRANSMISSION

[75] Inventor: Akimasa Mori, Fuji, Japan

[73] Assignee: Jatco Corporation, Japan

[21] Appl. No.: 647,256

[22] Filed: May 13, 1996

[30] Foreign Application Priority Data

May 16, 1995 [JP] Japan ................................ 7-141065

[51] Int. Cl.$^6$ .................................................. B60K 41/10
[52] U.S. Cl. ............................................ 477/114; 477/905
[58] Field of Search ........................................ 477/114, 905

[56] References Cited

U.S. PATENT DOCUMENTS 4,891,758  1/1990  Simonyi et al. ...................... 477/114

*Primary Examiner*—Dirk Wright
*Attorney, Agent, or Firm*—Rossi & Associates

[57] ABSTRACT

An automatic transmission control unit switches on and off operations for a plurality of solenoids in response to combinations of throttle openings estimated on the basis of an output of a throttle sensor and vehicle speeds estimated on the basis of an output of a vehicle speed sensor to set a proper speed change gear. The automatic control unit sets second gear when a vehicle is stopped to suppress creep during the stoppage of the vehicle, and starts the vehicle with the second gear as it is when the changing rate of the throttle opening is small. When the changing rate of the throttle opening exceeds a predetermined rate in an acceleration state, it is determined that an operator desires powerful acceleration and hence the operation is shifted to first gear. In contrast, when the operator requires a slow start, a second gear start is automatically selected without permitting down-shift to the first gear every time the vehicle is started.

3 Claims, 4 Drawing Sheets

Fig. 1

AUTOMATIC TRANSMISSION CONTROL UNIT

START CONTROLLER FOR AUTOMATIC TRANSMISSION

BACKGROUND OF THE INVENTION

1. Field of the Invention

The present invention relates to a start controller for an automatic transmission having a function of suppressing creep which causes fine speed advance of a vehicle without stepping on an acceleration pedal during the operation of an engine when a select lever is located at a forward advance position.

2. Description of the Prior Art

A typical vehicle including an automatic transmission permits a vehicle body to be brought into fine speed forward movement (hereinafter, referred simply to as creep.) when the automatic transmission is set to a forward advancement mode during the time an engine is operated but the vehicle is stopped. This is because that a first gear set to the automatic transmission in the stopped state has a high gear ratio, so that even slight driving force due to idle rotation of the engine is increased corresponding to the gear ratio of the first gear in a transmission mechanism and hence it is increased enough to rotate wheels.

To solve this, a method is presented in which a controller of an automatic transmission includes a creep suppression control function incorporated therein in which the automatic transmission is set to a second gear or higher during stoppage of a vehicle to automatically increase a speed change ratio whereby driving force of idle rotation of an engine does not get greater to rotate wheels through the transmission mechanism, eliminating the need of a driver to step on a brake pedal (otherwise, it will do for a driver to less step on).

An ordinary control function given to the controller of the automatic transmission is to control the speed change operation of the automatic transmission using allocation ranges of each gear that correspondes to throttle openings and vehicle speeds, to which function the first gear is in principle set when the vehicle is started.

Accordingly, in the controller of the automatic transmission having the creep suppression control function it is necessary to detect an operator's intention of starting the vehicle and to switch the control with the creep suppression function to the control with the ordinary control function.

Japanese Patent Application Laid-Open No. 62-184265 discloses an example of such a controller of an automatic transmission.

In this controller a vehicle speed and an engine revolution speed are detected to discriminate the operator's intention of continuation of stoppage and the operator's intention of a start, and sets a second gear to the automatic transmission for suppression of creep while interpreting the operator as having the intention of a start if the vehicle speed is less than a predetermined level, and returns the control to ordinary gear control when the engine revolution speed exceedes the predetermined level.

Viewed from the operator, the second gear is set to the automatic transmission to suppress the creep of a vehicle body when the operator has released his foot's hold from an acceleration pedal, while once the operator steps on the acceleration pedal to increase the engine revolution speed, the automatic transmission is immediately shifted down to a first gear and the vehicle body is powerfully accelerated, and thereafter it is changed to the second gear and to the third gear in response to the increase of the vehicle speed.

The controller of an automatic transmission disclosed in the Japanese Patent Application Laid-Open No. 62-184265 relatively succesfully functions for the creep suppression during the stoppage interval the operator has the intention of continuation of the stoppage, but it fails to control such a start operation that the automatic transmission is started with the second gear by discriminating specific operation conditions.

More specifically, when the operator steps on the acceleration pedal and hence the engine revolution speed is once raised, the control is automatically shifted to the first gear and substantially uniform start acceleration is achieved each time.

However, a second gear start is desired in several operation conditions. Namely, under the conditions where a vehicle is in a traffic jam with a short inter-vehicle distance and operations are repeated between stoppages and low speeds, a slow speed change and stable running are desired rather than a rapid response of a vehicle speed to operator's stepping on an acceleration pedal and powerful acceleration. In such a situation, an operator has the possibility of selecting a second gear start provided a manual shift transmission is installed on the vehicle.

Further, although in the case of a frozen road surface and a snow-covered road, a slow start and inertial running are ensured only by operator's setting of a particularly provided second gear start mode, in such a situation it is desired to discriminate the intention of an operator and automatically execute the second gear start for preparation of forgotten setting.

Furthermore, the engine revolution speed is increased against a load to rotate a torque converter so that it is increased, slightly delayed from the stepping on the acceleration pedal, more slowly than a change in throttle opening. It is therefore necessary to set predetermined level that is a threshold to transfer the operation to the ordinary control function to be lower in order to initiate acceleration in the ordinary control function without delaying so much from the stepping on the acceleration pedal.

Namely, if a start and acceleration are delayed even several seconds, although the operator steps on the acceleration pedal desiring a quick start and powerful acceleration, it is judged that operation properties are bad contrary to operator's expectation.

Idle speed of an engine is changed also owing to additional functions such as on and off operation of an air conditioner and an engine warming-up mode, so that when the predetermined revolution speed to transfer the operation to the ordinary control function are too low, the creep suppression control function is freely released even in the state where operator's foot is kept apart from the acceleration pedal to cause the possibility of any creep being produced irrespective of the intention of the operator.

SUMMARY OF THE INVENTION

It is an object of the present invention to provide a start controller of an automatic transmission which is capable of securely discriminating between the operator's intention of stoppage continuation and the operator's intention of a start and acceleration, and of automatically executing a second gear start in operation conditions where the operator desires starts with second or higher gear.

In accordance with the first aspect of the present invention, there is provided a start controller of an automatic transmission which includes control means for controlling speed change operation of the automatic transmission using allocation regions of speed change gears corresponding to combinations of throttle openings and vehicle speeds to set a predetermined low speed gear and control means for setting when a vehicle speed is a predetermined lower level including stoppage a high speed gear higher at least one gear or more than said predetermined low speed gear, the improvement being such that the start controller further includes throttle speed detection means for estimating a changing rate of said throttle opening in an acceleration state, means for switching a range over which said control means for setting said high speed gear is used to a predetermined first control pattern of a throttle opening and a vehicle speed when the rate of the change in said throttle opening is higher than the predetermined changing rate in the state where said high speed gear is set, and means for switching a range over which said control means for setting said high speed gear is used to a second control pattern of a wider range of the throttle opening than said first control pattern when said changing rate is lower than said predetermined changing rate in the state where said high speed gear is set.

In the start controller of the automatic transmission, there are switched ordinary control and control of suppressing creep with throttle opening that rapidly varies preceding the revolution speed of an engine and serves to discriminate between the operator's intention of continuation of stoppage and the operator's intentions of a start and acceleration more directly than the engine revolution speed.

Hereby, when an operator desires powerful acceleration the operation can be more securely and quickly shifted to the first gear compared with the case where a vehicle speed is used for the discrimination.

The present invention does not simply replace the engine revolution speed in a controller disclosed in the Japanese Patent Application Laid-Open No. 62-184265 with the throttle opening, but chiefly takes the changing rate of the throttle opening into consideration. More specifically, when the changing rate of the throttle opening is greater than the predetermined rate, creep is suppressed by setting a high speed gear with a predetermined range of the throttle opening and the vehicle speed (the first control pattern), while the changing rate of the throttle opening is smaller than the predetermined rate, the high speed gear is extended to a further wider range of the throttle opening (the second control pattern).

Hereby, when the rate of a change in the throttle opening is greater than the predetermined one it is determined that an operator desires powerful acceleration and an ordinary start originating from the low speed gear is performed, while when the rate of a change in the throttle opening is smaller than the predetermined one, it is determined that an operator desires a mild change in the vehicle speed and a start at the high speed gear is performed keeping the creep suppressed state intact.

Thus, the response of a vehicle and the state of acceleration satisfies the intention of an operator.

It is therefore possible to provide an automobile demonstrating a response obedient to the intention of an operator utilizing the advantage of the automatic transmission that even if it starts with the second gear or more, it is unlikely to get an engine failure.

The function to start a vehicle with the second gear or higher is achieved by extending the control to suppress the creep to a region after the start so that it is easily applicable to an automobile having a control function to at least suppress the creep.

In the control disclosed in the Japanese Patent Application Laid-Open No. 62-184265, a very low speed range due to the creep is determined to be the intention of continuation of stoppage, and the operation is transferred to the ordinary control immediately after the sign of the intention of a start is detected on the basis of the revolution speed of an engine. Namely, the creep suppression control is surely released just before the start.

In the present invention, on the contrary, the immediate return to the ordinary control is limited to the case where an operator strongly steps on the acceleration pedal, and when the changing rate of the throttle opening does not exceed the predetermined rate, a high speed gear with the control to suppress the creep takes over a start and acceleration and deceleration in the low vehicle speed region as they are.

More specifically, a control range to which the control to suppress the creep is applied is extended to the region after a start under predetermined conditions whereby an operator can secure a gentle start and more inertial running that avoids a rapid speed change without specific setting and operation such as a second speed start mode only by stepping on the acceleration pedal very mildly.

Said means to switch the operation to the first control pattern can be one which shifts to said predetermined low speed gear at timing to leave the first region defined in the low region of the throttle opening to switch the control to the control to set said predetermined low speed gear, in a case the changing rate of the throttle opening is greater than said predetermined rate when the throttle opening reaches to a predetermined level, and said means to switch the operation to said second control pattern continues said high speed gear until the operation leaves the second region extended to the side of the larger throttle opening including the first region.

In this case, a range to which the control to suppress the creep is applied is used properly into two classes corresponding to the great and small values of the changing rate of the throttle opening. Further, provided the changing rate of the throttle opening is greater than the predetermined rate when the throttle opening reaches the predetermined opening, an operator is supposed to desire powerful acceleration and the operation is returned to the ordinary control at timing leaving the first region. However, provided the changing rate of the throttle opening is less than the predetermined rate, an operator is supposed to desire a mild start and low speed running and the operation continues the control to suppress the creep as far as the operation leaves the second region extending to the higher throttle opening.

More specifically, the operation shifts to the first gear when the throttle opening reaches a predetermined opening sot hat there is no possibility of misjudgement of the intention of an operator at the level of a smaller throttle opening and executing meaningless shift-down operation.

In accordance with the second aspect of the present invention, there is provided a start controller of an automatic transmission which includes control means for controlling speed change operation of the automatic transmission using allocation regions of speed change gears corresponding to combinations of throttle openings and vehicle speeds to set a predetermined low speed gear and control means for setting when a vehicle speed is a predetermined level including stoppage or lower a high speed gear higher at least one gear than said predetermined low speed gear, the improvement being such that the start controller further includes continuation means for continuing control with said control means to set said high speed gear when said throttle opening is lower than the predetermined opening in the state where said high speed gear is set, return means for switching control with said control means for setting said high speed gear to control with said control means for setting said predetermined low speed gear when the throttle opening exceeds the predetermined opening in an acceleration state, and return delay means for continuing the control with said control means for setting the operation to said high speed gear till the lapse of predetermined time even when the throttle opening exceeds said predetermined opening in an acceleration state.

Even in the present start controller, switching timing from the creep suppression control to the ordinary control is determined using the throttle opening so that compared with the case determined with the vehicle speed the operation can be securely and quickly shifted to the first gear when an operator desires powerful acceleration.

Once an operator strongly steps on the acceleration pedal, the control to suppress the creep is released after the lapse of the predetermined time. At this time, provided the operation stays within the allocation region for the first gear, the shift operation to the first gear is performed with the ordinary control.

Further, even when the throttle opening reaches the predetermined opening in an acceleration state after the start with the second gear by the control to suppress the creep, the control to suppress the creep is released after the lapse of predetermined time, and provided the operation falls within the allocation region for the first gear, the operation shifts to the first gear with the ordinary control.

However, the control to suppress the creep is continued as long as the throttle opening does not reach the predetermined opening, and mild acceleration using the high speed gear is secured until the vehicle speed reaches a predetermined vehicle speed.

Since the operation shifts to the first gear after the state where the throttle opening exceeds the predetermined opening elapses a predetermined time, there is no possibility of operator's intention being misjudged owing to up and down variations of the throttle opening to execute meaningless shift operation.

Further, even in this case, it will do to determine the changing rate of the throttle opening and properly use the first region and the second region corresponding to two predetermined openings. When the changing rate of the throttle opening is higher than the predetermined rate the first region defined in the region of the low throttle opening is applied. In contrast, when the changing rate of the throttle opening is lower than the predetermined rate, the second region extended to the side of the higher throttle opening including the first region is applied.

The control to suppress the creep is applicable not only to a time interval after the start of a vehicle but also to the case where the operation transfers from the running state of a higher vehicle speed to that of a lower vehicle speed. For example, the ordinary control is switched to the control to suppress the creep when gear changes between the first and second gears are repeated or when acceleration and deceleration are repeated in the lower vehicle speed region. Hereby, a stable running state with a mild change in the vehicle speed is achieved when an automobile is caught up into any trouble such as a traffic jam, and hence an operator can easily keep an inter-vehicle distance.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENT

In what follows, there will be described start control by an automatic transmission control unit with reference to FIGS. 1 to 5.

Figure 1:
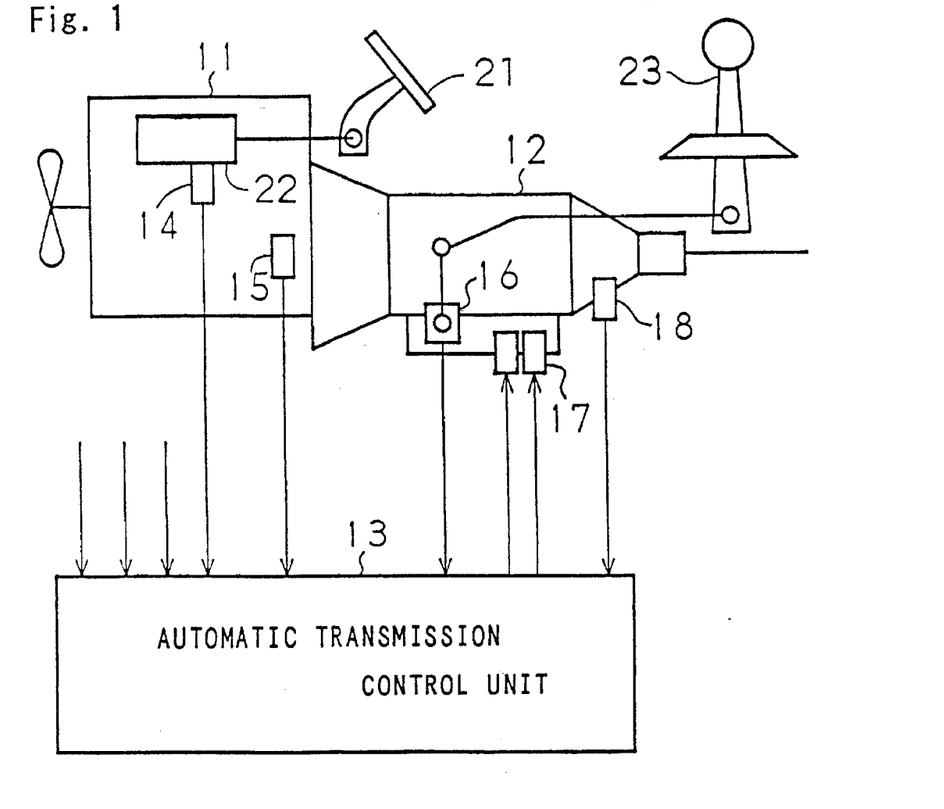
FIG. 1 is a view illustrating a control system of an automatic transmission.

FIG. 1 illustrates a control system. A throttle sensor 14 is provided on a throttle valve 22 of an engine 11 for detecting throttle opening. The throttle opening of the throttle valve 22 changes correspondingly to the amount of stepping by an operator on an acceleration pedal 21 to increase and decrease output revolution speed of the engine 11. A revolution sensor 15 provided on the engine 11 detects the speed of revolution of an output shaft of the engine 11.

Speed change modes of 6 classes of an automatic transmission 12: forward 3, reverse 1, neutral, and parking are set with a shift lever 23. These speed change modes are detected by a rotary switch 16 mounted on the automatic transmission 12.

The revolution speed of the output shaft of the automatic transmission 12 detected by a vehicle speed sensor 18 corresponds to a vehicle speed level of an automobile.

The total five speed change gears of forward 4 and reverse 1 can be set to the automatic transmission 12. Setting of the speed change gears is executed by on and off combinations of a plurality of solenoid valves 17 provided on the automatic transmission 12.

The automatic transmission control unit 13 for controlling the automatic transmission 12 incorporates outputs of the throttle sensor 14, revolution sensor 15, rotary switch 16, vehicle speed sensor 18, other sensors and instruments and executes necessary arithmetic operation processings, and estimates a speed change gear to be set to the automatic transmission under operation conditions at that time to switch the on-off combinations of the solenoid valves 17.

Figure 2:
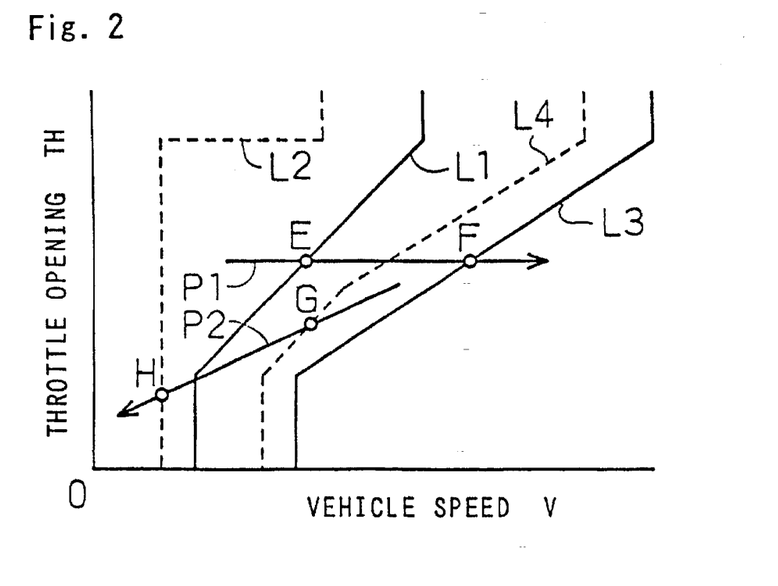
FIG. 2 is a view illustrating allocation regions of first and second gears in ordinary speed change control.

The automatic transmission control unit 13 allocates the first gear and the second gear as illustrated in FIG. 2 in the ordinary control, and switches the speed change gears of the automatic transmission 12 in response to a combination of a vehicle speed V estimated from an output of the vehicle speed sensor 18 and a throttle opening TH estimated from an output of the throttle opening sensor 14.

For the shift-up gear change there are allocated the first gear in a region located on the left side of a speed change line L1, the second gear between the speed change line L1 and the speed change line L3, and the third gear in a region located on the right side of the speed change line L3. In contrast, for the shift-down gear change there are allocated the first gear in a region located on the left side of the speed change line L2, the second gear between the speed change line L2 and the speed change line L4, and the third gear in a region on the right side of the speed change line L4. There is further allocated a speed change line of the fourth gear (not illustrated) on the right side of the speed change lines L3, L4.

For example, in the acceleration state indicated by an arrow P1, there are executed the shift-up gear change from the first gear to the second gear at a point E where the arrow intersects the speed change line L1, and the shift-up gear change from the second gear to the third gear at a point F where the arrow intersects the speed change line L3. Further, in the deceleration state indicated by an arrow P2, there are executed the shift-down gear change from the third gear to the second gear at a point G where the arrow P2 intersects the speed change line L4, and the shift-down gear change from the second gear to the first gear at a point H where the arrow intersects the speed change line L2.

However, when an automobile has been stopped, the ordinary control is replaced for the creep suppression control, and the second gear is set to the automatic transmission 12 to increase the speed change ratio whereby there is prevented the creep where the automobile advances at a fine speed owing to the idle rotation of the engine 11.

Return to the ordinary control from the creep suppression control is immediately executed when the acceleration pedal 21 is strongly stepped on, while it is executed at the stage the automobile has been completely started and reaches a predetermined speed when the acceleration pedal 21 is mildly stepped on.

Herein, the strength of the stepping on the acceleration pedal 21 is determined by calculating the changing rate Vth of the throttle opening TH and judging whether the rate Vth is less than a predetermined rate (a).

Figure 3:
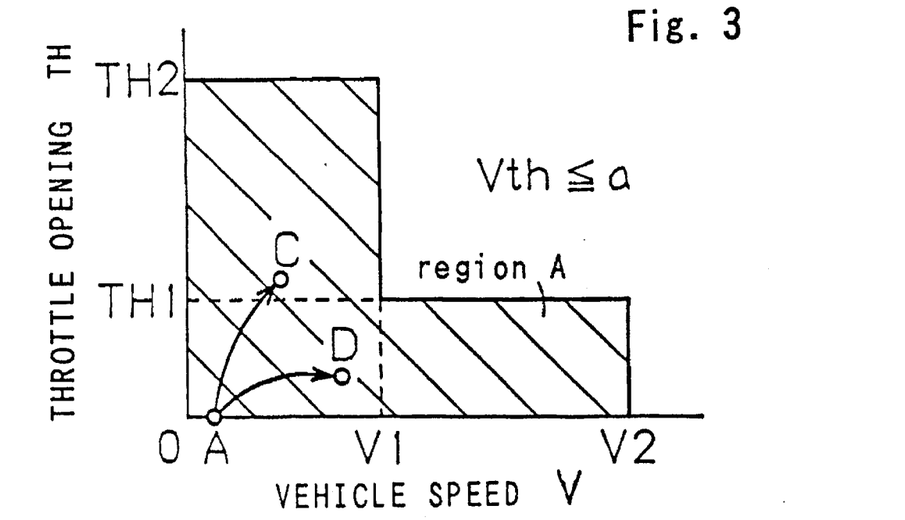
FIG. 3 is a view illustrating a region to which control to suppress creep is applied in which a region A is illustrated that is applied to mild stepping on an acceleration pedal.
Figure 4:
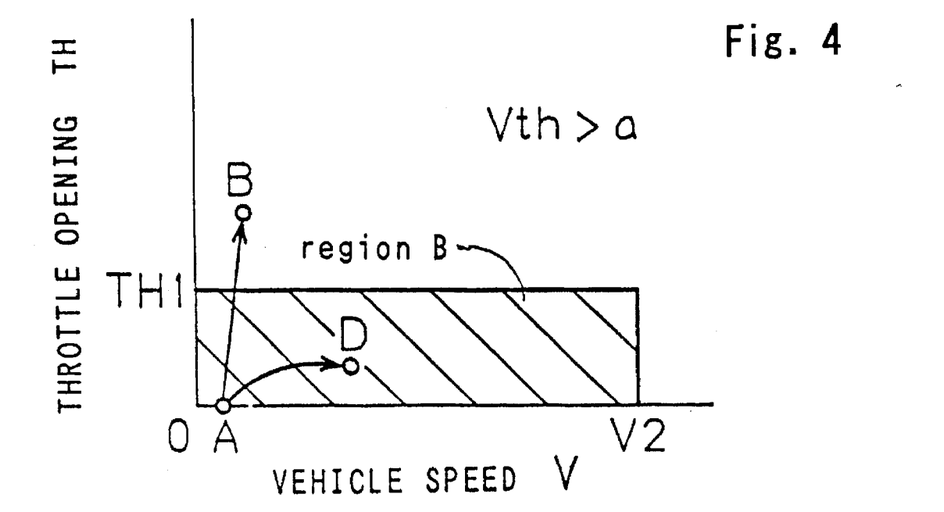
FIG. 4 is a view illustrating a region B that is applied to strong stepping on an acceleration pedal.

More specifically, when the changing rate Vth of the throttle opening TH exceeds the predetermined value (a), a region B in FIG. 4 is used as a range to which the creep suppression control is applicable. In contrast, when the rate Vth is the set value (a) or lower, an extended region A illustrated in FIG. 3 is used as the range to which the creep suppression control is applicable.

For example, in an acceleration pattern lying from the point A to D illustrated in FIGS. 3 and 4, the throttle opening Th does not reach the threshold TH1, so that setting of the second gear by the creep suppression control is continued until the operation reaches the vehicle speed V2. Since the vehicle speed V2 is defined between the speed change line L1 and the speed change line L3, the first gear is not quite used in such a start acceleration state.

In an acceleration pattern lying from the point A to C illustrated in FIG. 3, since the rate Vth is the set value (a) or less even if the throttle opening TH exceeds a threshold TH1, setting of the second gear by the creep suppression control is continued until the vehicle speed V1 or a threshold TH2 is reached. In such a start acceleration state, the operation returns to the ordinary control for the first time after the throttle opening TH reaches the threshold TH2 and is shifted to the first gear, and hence powerful acceleration with the first gear is initiated.

In an acceleration pattern lying from the point A to B illustrated in FIG. 4, an operator strongly steps on the acceleration pedal and the rate Vth exceeds the set value (a) at the time the throttle opening TH exceeds the threshold TH1, so that the operation immediately returns to the ordinary control and is shifted down to the first gear, and hence powerful acceleration with the first gear is initiated.

Figure 5:
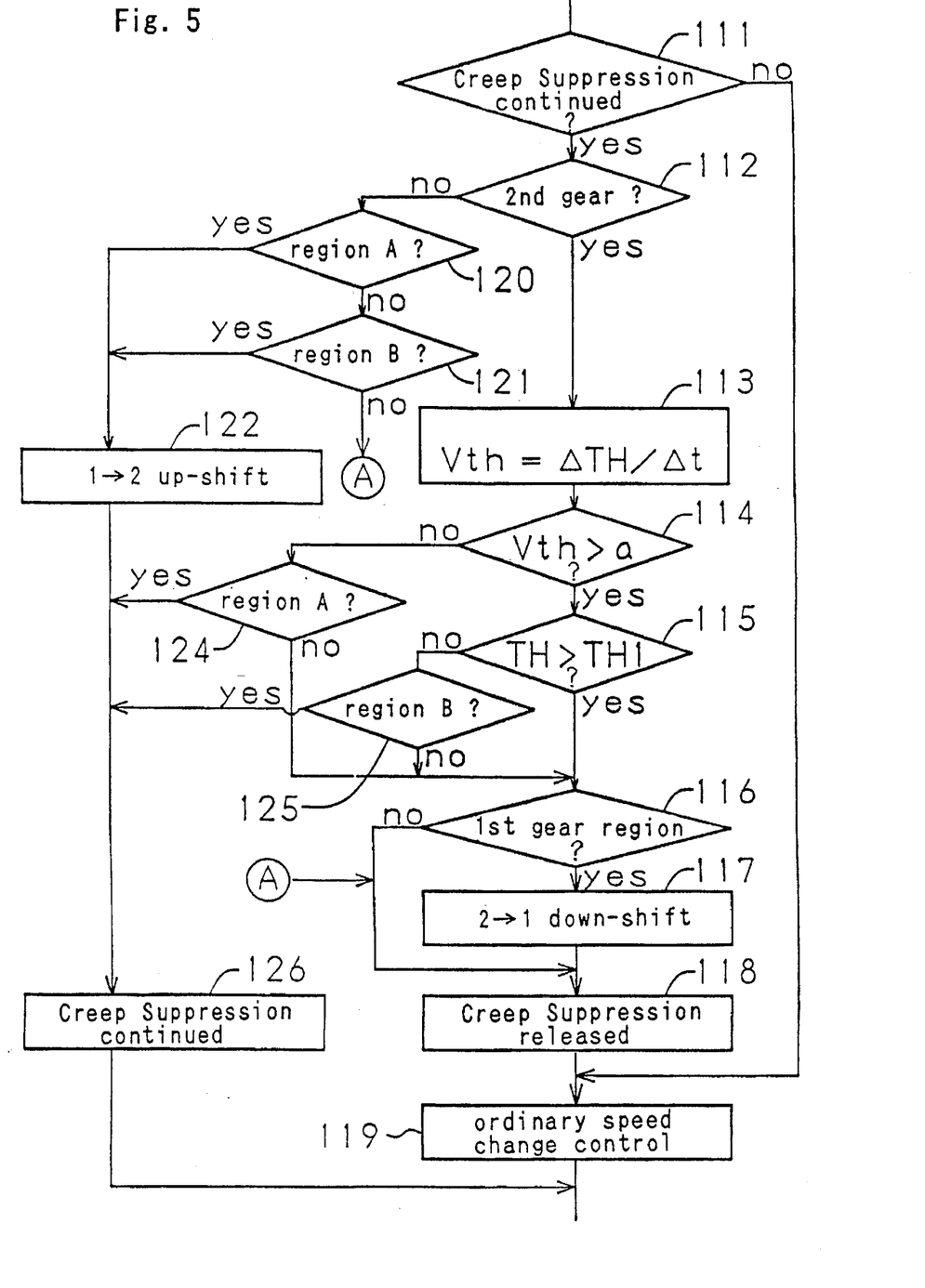
FIG. 5 is a flow chart illustrating start control.

FIG. 5 is a flow chart illustrating such creep suppression control. The control flow is inserted in an ordinary control flow in the automatic transmission control unit 13.

In step 111, continuation/prohibition of the creep suppression control is judged. Continuation is determined when the rotary switch 16 is set to the forward advance mode and the vehicle speed V is 0 or when a continuation flag set in later step 126 is 1. Otherwise, the operationn goes to step 119 for execution of the ordinary control. With the continuation there is executed the creep suppression control constructed with steps 112 to 118 and steps 120 to 126.

In step 112, it is determined whether the speed change gear of the automatic transmission 12 is the second gear or not. Since with the vehicle speed V being 0 and in the early stage of the vehicle being stopped, the speed change gear of the automatic transmission 12 is the first gear, the operation goes from step 120 to 122 and is shifted up to the second gear, and the continuation flag is set to 1 in step 126. Thereafter, the operation is determined to be at the second gear in step 112 to successively suppress the creep during the stoppage of the vehicle.

In step 113, the changing rate Vth of the throttle opening TH is estimated using stored data of the momentary throttle opening TH.

In step 114, it is determined whether the estimated changing rate Vth of the throttle opening exceeds the set value (a) or not. When the rate Vth is the set value (a) or less, the operation goes to step 124 where it is judged whether the combination of the vehicle speed V and the throttle opening TH falls within the region A or not. If the operation is determined to be within the region A, the operation goes to step 126 to keep the second gear with the creep suppression control. When the rate Vth exceeds the set value (a), the operation goes to step 115 where it is determined whether the throttle opening TH exceeds the threshold TH1 or not.

When the throttle opening TH is the threshold TH1 or less, the operation goes to step 125 where it is determined whether the combination of the vehicle speed V and the throttle opening TH falls within the region B or not. If the combination is determined to fall within the region B, the operation goes to step 126 where the second gear by the creep suppression control is maintained.

In the cases where the throttle opening TH is determined to be the threshold TH1 or more in step 115, or the combination is determined to be outside the region A in step 124 or outside the region B in step 125, the operation is returned to the ordinary speed change control.

If the combination of the throttle opening TH and the vehicle speed V already falls within the second gear region, the operation goes from step 116 to step 118 where the continuation flag is set to 0. If the combination stays within the first gear region, the operation goes from step 116 to 117 where it is shifted down to the first gear, and thereafter the operation goes to step 118 where the continuation flag is set to 0.

By the fact that the continuation flag is set to 0 in step 118 the creep suppression control is prohibited until the vehicle is next stopped.

According to the automatic transmission control unit 12 of the first embodiment, there is ensured a slow start with the second gear and stable running avoiding a rapid speed change in the case where a start and fine forward speed advance are repeated in a traffic jam with a shorter inter-vehicle distance. Also in the case where an operator carefully steps on the acceleration pedal on a frozen road surface or a snow-covered road, a slow start with the second gear is ensured.

Since in these cases acceleration after a start is executed more inertially, there is no fear of unexpected powerful acceleration being produced even though output torque of the engine 11 and the idle speed are rapidly increased owing to on-off operation of an air conditioner, engine warming-up operation and other output controls.

Selection of such a second gear start is automatically executed by discriminating the changing rate of the throttle opening (strength of stepping on the acceleration pedal by an operator) so that there is no need of purposely performing setting and release by an operator as in a snow mode and so on.

Further, since a such second gear start function is realized with a slight alteration of a creep suppression control program for preventing the creep during the stoppage of the vehicle using the existing sensors and switches and the like as they are, there is no need of additionally providing specific sensors, setting switchs and instruments on the vehicle body, and there is further no need of altering wirings in the vehicle body including the automatic transmission control unit 12.

It should be noticed that the region A corresponds to the second control pattern and the second region of the present invention, and the region B corresponds to the first control pattern and the first region of the present invention. It should be further noticed that step 119 in the processing flow in FIG. 5 corresponds to the control means for setting the predetermined low speed gear of the present invention, steps 111,112,120 to 122, and 126 correspond to the control means for setting the high speed change gear of the present invention, steps 113, 114 correspond to the means for switching the first control pattern to the second control pattern of the present invention, steps 116 to 118 to the return means of the present invention, steps 113, 115 to the means for switching the second control pattern to the first control pattern, and steps 124,125 correspond to the continuation means of the present invention.

Figure 6:
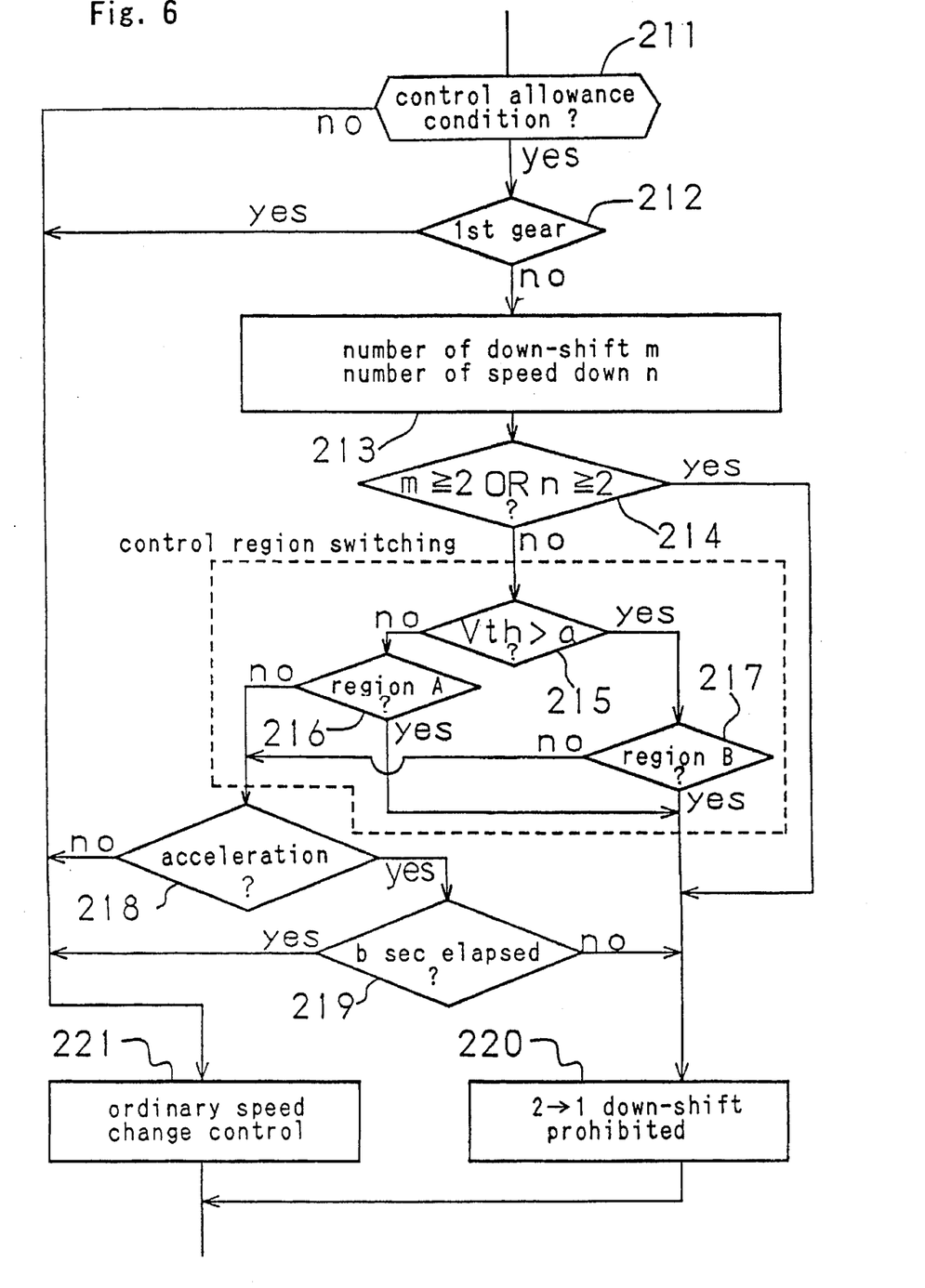
FIG. 6 is a flow chart illustrating start control in a second embodiment.

FIG. 6 is a flow chart illustrating the start control in a second embodiment. In the second embodiment, the constuction in FIG. 1, the ordinary control in FIG. 2, and the setting of the regions A and B in FIGS. 3, 4 are commonly used, and the processing flow in FIG. 5 is replaced for the processing flow in FIG. 6.

As illustrated in FIG. 6, in step 211, control allowance conditions of the creep suppression control are determined. The rotary switch 16 is set to the forward advance mode whereby the creep suppression control is allowed when the vehicle speed V is V2 or less. Otherwise, the creep suppression control is prohibited and the operation goes to step 221.

In step 221, ordinary speed change control is executed. More specifically, provided the second gear or higher is set to the automatic transmission and the combination of the throttle opening and the vehicle speed falls in the allocation region for the first gear in FIG. 2, shift-down to the first gear is executed.

In step 212, it is determined whether a set of signals to a plurality of the solenoids 17 of the automatic transmission 12 is corresponding to the first gear or not.

With the first gear, since the down-shift to the first gear has been already completed even though the vehicle speed V is V2 or lower, the operation goes to step 221 where the ordinary speed change control is applied. Otherwise, the operation goes to step 213.

It should be noticed that the fact that the control allowance conditions are met and the signals are for a gear other than the first gear indicates the state that the creep suppression control has been actually continued in the region A in FIG. 3 (or the region B in FIG. 4) or the vehicle speed has been lowered to V2 or lower with the ordinary speed change control.

In the second embodiment, the creep suppression control is applied even in the case, additionally to the time interval the operation escapes the region A (or the region B) after a start, where the vehicle speed is lowered because of the vehicle being caught up in a traffic jam during the running and hence acceleration and deceleration are repeated in the region A (or region B).

In step 213, there are estimated the number of times m of down-shift from the second gear to the first gear during past 10 seconds and the number of times n of the vehicle speed being lowered across the vehicle speed C. The vehicle speed C is a set value for determining conditions that wasteful shift-down to the first gear could be executed unless the shift-down to the first gear is executed, and is intermediate between a speed corresponding to the throttle opening TH=0 on the speed change line L2 in FIG. 2 and a speed corresponding to the throttle opening TH=0 on the speed change line L4.

In step 214, it is determined that the operation is under conditions where acceleration and deceleration are repeated in the low vehicle speed region provided the number m or the number n is 2 or more, and the operation unconditionally goes to step 220 where the creep suppression control is applied and meaningless shift-down to the first gear is prohibited.

Provided the number m or n is 1 or 0, the operation goes to the next control region switching steps (215 to 217). The operation can be returned to the ordinary control provided an operator steps on the acceleration pedal in the acceleration state.

In step 215, it is determined whether the changing rate Vth of the throttle opening TH exceeds the set value (a) or not. If the set value (a) is exceeded, the operation goes to step 217 where it is determined whether the combination of the throttle opening TH and the vehicle speed V falls within the region B in FIG. 4 or not.

If the rate Vth is the set value (a) or less, the operation goes to step 216 where it is determined whether the combination of the throttle opening TH and the vehicle speed V falls within the region A in FIG. 3 or not.

When it is determined in step 216 that the operation falls within the region A (or within the region B in step 217), the operation goes to step 220 where the creep suppression control is applied and stable running is ensured avoiding a rapid speed change.

In contrast, when it is determined in step 216 that the combination is outside the region A (or region B in step 217), the operation basically goes to step 221 where the ordinary control is applied.

However, even when the operation escapes from the region A (or region B) in an accelaration state, the second gear or more with the creep suppression control is continued until b second (e.g., 0.3 second) elapses after the escape. Hereby, there is prevented unnecessary shift-down to the first gear when the throttle opening TH is varied up and down.

More specifically, in step 218, it is determined on the basis of stored data of the vehicle speed V estimated from an output of the vehicle speed sensor 18 whether the vehicle is in the acceleration state or not. With the acceleration state, it is determined that an operator strongly steps on the acceleration pedal to obtain powerful acceleration, and the operation goes to step 219.

In contrast, the state of the greater throttle opening in the deceleration state or in a constant speed running state means that an operator feels insufficient power because of the vehicle reaching an upward slope for example so that the operation is returned to the ordinary control through step 218 to exhibit powerful acceleration with the first gear.

In step 219, it is determined whether b second elapses after the operation escapes the region A (or region B) or not. If it is prior to the lapse of b second, the operation goes to step 220 where the speed change gear of the second gear or more with the creep suppression control is kept. After the lapse of b second, the operation goes to step 221 where the ordinary control is applied, and if the operation is in the allocation region for the first gear, shift-down to the first gear is executed.

According to the start control of the second embodiment, the shift-down to the first gear is executed for the first time when the operation continuously escapes from the region A (or region B) for b second in the acceleration state so that there is eliminated meaningless repetition of the down-shift to the first gear when an operator unnecessarily varies the throttle opening up and down.

More specifically, an output of the automatic transmission varies each time the speed change is executed to cause slight speed change shock and further to cause a response of the vehicle body to the stepping by an operator on the acceleration pedal to be changed. Accordingly, driving characteristics and comfortabilities are improved and the running condition is also stabilized by eliminating the meaningless shift-down to the first gear.

Further, the creep suppression control is assumed to be applied, additionally to the time interval until the operation escapes the region A (or region B) after a start, also when the vehicle speed is lowered under the ordinary control and the operation enters the region A (or region B), and since the operation is returned to the ordinary control only by permitting an operator to step on the acceleration pedal in any case, acceleration performance and driving response in the low vehicle speed region are uniformed to prevent the operator to feel a sense of incompatibility due to the creep suppression control.

Further, under the conditions where the automobile is caught up in a traffic jam during the running, and hence acceleration and deceleration are repeated in the low vehicle speed region; the shift-down to the first gear is prohibited until the repetition is interrupted to ensure the running with the stable vehicle speed, so that an inter-vehicle distance can be easily kept to improve the driving characteristics of an automobile installed with the automatic transmission.

It should be noticed that step 221 in FIG. 6 corresponds to the control means of the present invention for setting a predetermined low speed gear, step 220 to the control means of the present invention for setting the high speed gear, step 215 to the means of the present invention for switching the operation to the second control pattern and the means for switching the operation to the first control pattern, steps 216 and 217 to the continuation means of the present invention, steps 216 to 218 to the return means of the present invention, and step 219 corresponds to the return delay means of the present invention.

What is claimed is:

1. A start controller of an automatic transmission including control means for controlling speed change operation of the automatic transmission using allocation regions of speed change gears corresponding to combinations of throttle openings and vehicle speeds to set a predetermined low speed gear and control means for setting a high speed gear higher at least one gear or more than said predetermined low speed gear when a vehicle speed is lower than a predetermined level including stoppage, the improvement being such that the start controller further includes:

throttle speed detection means for estimating the changing rate of said throttle opening in an acceleration state;

means for switching a range over which said control means for setting said high speed gear is used to a predetermined first control pattern of the throttle opening and the vehicle speed when a changing rate of said throttle opening is higher than the predetermined rate in the state where said high speed gear is set; and means for switching a range over which said control means for setting said high speed gear is used to a second control pattern of a wider range of the throttle opening than said first control pattern when said changing rate is lower than said predetermined rate in a state where said high speed gear is set.

2. A start controller of an automatic transmission according to claim 1, wherein said means to switch the operation to the first control pattern shifts the operation to said predetermined low speed gear at timing to leave a first region defined in a low region of the throttle opening to switch the control to the control to set said predetermined low speed gear, in a case the changing rate of the throttle opening is greater than said predetermined rate when the throttle opening reaches to a predetermined level, and said means to switch the operation to said second control pattern continues said high speed gear until the operation leaves a second region extended to the side of the larger throttle opening including the first region.

3. A start controller of an automatic transmission including control means for controlling speed change operation of the automatic transmission using allocation regions of speed change gears corresponding to combinations of throttle openings and vehicle speeds to set a predetermined low speed gear and control means for setting a high speed gear higher at least one gear than said predetermined low speed gear when a vehicle speed is a predetermined level including stoppage, the improvement being such that the start controller further includes:

continuation means for continuing control with said control means to set said high speed gear when said throttle opening is lower than a predetermined opening in a state where said high speed gear is set;

return means for switching control with said control means for setting said high speed gear to control with said control means for setting said predetermined low speed gear when the throttle opening exceeds the predetermined opening in an acceleration state; and return delay means for continuing the control with said control means for setting the operation to said high speed gear till the lapse of predetermined time even when the throttle opening exceeds said predetermined opening in an acceleration state.

* * * * *